United States Patent
Seder et al.

(10) Patent No.: US 11,059,035 B2
(45) Date of Patent: *Jul. 13, 2021

(54) SELF-CLEANING FILM SYSTEM AND METHOD OF FORMING SAME

(71) Applicant: GM GLOBAL TECHNOLOGY OPERATIONS LLC, Detroit, MI (US)

(72) Inventors: Thomas A. Seder, Fraser, MI (US); James A. Carpenter, Rochester Hills, MI (US); Gayatri V. Dadheech, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,812

(22) Filed: Feb. 5, 2020

(65) Prior Publication Data
US 2020/0171476 A1      Jun. 4, 2020

Related U.S. Application Data

(63) Continuation of application No. 15/598,829, filed on May 18, 2017, now Pat. No. 10,583,428.

(51) Int. Cl.
*B01J 35/00* (2006.01)
*B01J 21/06* (2006.01)
(Continued)

(52) U.S. Cl.
CPC ........... *B01J 35/004* (2013.01); *B01J 21/063* (2013.01); *B08B 17/02* (2013.01); *B08B 17/065* (2013.01); *G02B 27/0006* (2013.01); *B82Y 30/00* (2013.01)

(58) Field of Classification Search
CPC ......... B01J 21/063; B01J 35/004; C09D 5/00; C09D 5/1681; G02B 1/11; G02B 1/18;
(Continued)

(56) References Cited

U.S. PATENT DOCUMENTS

| | | |
|---|---|---|
| 4,047,804 A | 9/1977 | Stephens |
| 4,449,050 A | 5/1984 | Kamhi |
| | (Continued) | |

FOREIGN PATENT DOCUMENTS

| | | |
|---|---|---|
| CN | 201035171 Y | 3/2008 |
| CN | 101422974 A | 5/2009 |
| | (Continued) | |

OTHER PUBLICATIONS

Science Mission Directorate, "Visible Light," NASA Science 2010, National Aeronautics and Space Administration; <http://science.nasa.gov/ems/09_visiblelight>.

(Continued)

*Primary Examiner* — Frank J Vineis
*Assistant Examiner* — Laura B Figg
(74) *Attorney, Agent, or Firm* — Harness, Dickey & Pierce, P.L.C.

(57) ABSTRACT

A self-cleaning film system configured for reducing a visibility of a contaminant includes a substrate and a film. The film includes a monolayer defining a plurality of cavities and formed from a first material having a first surface energy, and a plurality of patches disposed within the plurality of cavities. Each of the patches is formed from a photocatalytic material having a second surface energy that is higher than the first. The film has a touchpoint area having a first use frequency, and a second area having a second use frequency that is less than the first. The patches are present in the touchpoint area in a first concentration and are configured to direct the contaminant towards the second area. The patches are present in the second area in a second concentration that is higher than the first and are configured to reduce the visibility of the contaminant.

20 Claims, 4 Drawing Sheets

(51) Int. Cl.
  B08B 17/02 (2006.01)
  G02B 27/00 (2006.01)
  B08B 17/06 (2006.01)
  B82Y 30/00 (2011.01)
(58) Field of Classification Search
  CPC ... G02B 27/0006; B08B 17/02; B08B 17/065; B82Y 30/00
  See application file for complete search history.

(56) References Cited

U.S. PATENT DOCUMENTS

| | | | |
|---|---|---|---|
| 4,536,179 | A | 8/1985 | Anderson et al. |
| 4,915,981 | A | 4/1990 | Traskos et al. |
| 6,055,085 | A | 4/2000 | Nakashima et al. |
| 6,101,266 | A | 8/2000 | Laskowski et al. |
| 6,406,158 | B1 | 6/2002 | Ohkawa |
| 6,797,974 | B2 | 9/2004 | Philipp et al. |
| 7,359,543 | B2 | 4/2008 | Tsuji et al. |
| 8,047,426 | B2 | 11/2011 | Haycock et al. |
| 9,044,574 | B2 | 6/2015 | Yoshimachi |
| 9,259,513 | B2 | 2/2016 | Bedwell et al. |
| 9,468,088 | B2 | 10/2016 | Nah |
| 9,611,016 | B2 | 4/2017 | Salters et al. |
| 9,861,974 | B2 | 1/2018 | Dadheech et al. |
| 10,052,622 | B2 | 8/2018 | Dadheech et al. |
| 10,195,602 | B2 | 2/2019 | Dadheech et al. |
| 10,274,647 | B2 | 4/2019 | Seder et al. |
| 10,429,641 | B2 | 10/2019 | Carpenter et al. |
| 10,533,249 | B2 | 1/2020 | Dadheech et al. |
| 10,556,231 | B2 | 2/2020 | Dadheech et al. |
| 10,569,263 | B2 | 2/2020 | Dadheech et al. |
| 10,583,428 | B2 * | 3/2020 | Seder et al. ............ C09D 5/14 428/328 |
| 10,754,067 | B2 | 8/2020 | Seder et al. |
| 2005/0186871 | A1 | 8/2005 | Hockaday |
| 2005/0191505 | A1 | 9/2005 | Akarsu et al. |
| 2006/0150862 | A1 | 7/2006 | Zhao et al. |
| 2007/0237943 | A1 | 10/2007 | Wakizaka et al. |
| 2008/0053308 | A1 | 3/2008 | Marzolin et al. |
| 2009/0045617 | A1 | 2/2009 | Lawandy et al. |
| 2009/0130608 | A1 | 5/2009 | Irving et al. |
| 2009/0196791 | A1 | 8/2009 | Ogata |
| 2009/0267015 | A1 | 10/2009 | Ogata |
| 2010/0028604 | A1 | 2/2010 | Bhushan et al. |
| 2010/0128965 | A1 | 5/2010 | Blair |
| 2011/0200656 | A1 | 8/2011 | Olsson |
| 2011/0220855 | A1 | 9/2011 | Weir et al. |
| 2013/0087374 | A1 | 4/2013 | Nah |
| 2014/0083473 | A1 | 3/2014 | Lawandy |
| 2014/0147654 | A1 | 5/2014 | Walther et al. |
| 2015/0238644 | A1 | 8/2015 | Sung et al. |
| 2016/0107204 | A1 | 4/2016 | Lawandy |
| 2017/0056871 | A1 | 3/2017 | Dadheech et al. |
| 2018/0154345 | A1 | 6/2018 | Dadheech et al. |
| 2018/0318820 | A1 | 11/2018 | Dadheech et al. |
| 2018/0320023 | A1 | 11/2018 | Dadheech et al. |
| 2018/0333710 | A1 | 11/2018 | Dadheech et al. |
| 2018/0333711 | A1 | 11/2018 | Dadheech et al. |
| 2018/0333756 | A1 | 11/2018 | Seder et al. |
| 2018/0334742 | A1 | 11/2018 | Dadheech et al. |
| 2018/0335548 | A1 | 11/2018 | Seder et al. |
| 2018/0348509 | A1 | 12/2018 | Carpenter et al. |
| 2019/0369389 | A1 | 12/2019 | Carpenter et al. |
| 2020/0147598 | A1 | 5/2020 | Dadheech et al. |
| 2020/0200946 | A1 | 6/2020 | Seder et al. |

FOREIGN PATENT DOCUMENTS

| | | |
|---|---|---|
| CN | 101868762 A | 10/2010 |
| CN | 102998723 A | 3/2013 |
| CN | 103241961 A | 8/2013 |
| CN | 103740292 A | 4/2014 |
| CN | 103950248 A | 7/2014 |
| CN | 105038438 A | 11/2015 |
| CN | 106477901 A | 3/2017 |
| CN | 106633158 A | 5/2017 |
| CN | 107083184 A | 8/2017 |
| CN | 108948889 A | 12/2018 |
| CN | 108949031 A | 12/2018 |
| CN | 108949050 A | 12/2018 |
| CN | 108953597 A | 12/2018 |
| CN | 108953598 A | 12/2018 |
| CN | 108976873 A | 12/2018 |
| DE | 102018111826 A1 | 11/2018 |
| DE | 102018111827 A1 | 11/2018 |
| DE | 102018111828 A1 | 11/2018 |
| DE | 102018111830 A1 | 11/2018 |
| DE | 102018111831 A1 | 11/2018 |
| DE | 102018112987 A1 | 12/2018 |
| JP | S63308920 A | 12/1988 |
| KR | 20160012190 A | 2/2016 |
| WO | 2005077556 A1 | 8/2005 |
| WO | 2011123373 A1 | 10/2011 |
| WO | 2015194200 A1 | 12/2015 |

OTHER PUBLICATIONS

First Office Action for Chinese Patent Application No. 201810443424.3 dated Oct. 9, 2019 with English language machine translation, 11 pages.

First Office Action for Chinese Patent Application No. 201810440683.0 dated Oct. 18, 2019 with English language machine translation, 14 pages.

Dadheech, Gayatri V. et al., U.S. Appl. No. 16/742,491, filed Jan. 14, 2020 entitled "Self-Cleaning Film System and Method of Forming Same," 31 pages.

First Office Action for Chinese Patent Application No. 201810465452.5 dated Feb. 3, 2020 with English language machine translation, 21 pages.

Xin, Zhong et al., "Research progress of fabrication and application of superamphiphobic surface," Chemical Industry and Engineering Progress, 2, pp. 447-455, 478 (2015) (Abstract Only).

First Office Action for Chinese Patent Application No. 201810440411.0 dated Mar. 4, 2020 with English language machine translation, 21 pages.

First Office Action for Chinese Patent Application No. 201810435135.9 dated Mar. 12, 2020 with English language machine translation, 18 pages.

Seder, Thomas A. et al., U.S. Appl. No. 16/809,056, filed Mar. 4, 2020 entitled, "Textured Self-Cleaning Film System and Method of Forming Same," 31 pages.

First Office Action for Chinese Patent Application No. 201810437022.2 dated Jun. 3, 2020 with English language machine translation, 16 pages.

Second Office Action for Chinese Patent Application No. 201810443424.3 dated Jun. 28, 2020 with English language machine translation, 14 pages.

Second Office Action for Chinese Patent Application No. 201810465452.5 dated Aug. 5, 2020 with English language machine translation, 10 pages.

* cited by examiner

SELF-CLEANING FILM SYSTEM AND METHOD OF FORMING SAME

CROSS-REFERENCE TO RELATED APPLICATIONS

This application is a continuation of U.S. patent application Ser. No. 15/598,829 filed on May 18, 2017, which issued as U.S. Pat. No. 10,583,428. The entire disclosure of the above application is incorporated herein by reference.

INTRODUCTION

The disclosure relates to a self-cleaning film system and to a method of forming the self-cleaning film system.

Devices, such as display systems, are often designed to be touched by an operator. For example, a vehicle may include a display system that presents information to an operator via a touchscreen. Similarly, an automated teller machine or kiosk may include a display system that is activated by touch.

Other devices, such as cameras and eyeglasses, generally include a lens surface which may be inadvertently touched by an operator during use. Further, other devices such as vehicles, windows, mirrors, appliances, cabinetry, furniture, cellular telephones, fingerprint scanners, sensors, copiers, medical instruments, and countertops may also include one or more surfaces which may be touched by an operator. Therefore, during use, an operator may deposit fingerprints and/or oils onto such devices and surfaces.

SUMMARY

A self-cleaning film system configured for reducing a visibility of a contaminant includes a substrate and a film disposed on the substrate. The film includes a monolayer defining a plurality of cavities and formed from a first material having a first surface energy. The film also includes a plurality of patches disposed within the plurality of cavities such that the plurality of patches abut the first material. Each of the plurality of patches is formed from a photocatalytic material having a second surface energy that is higher than the first surface energy. The film has a touchpoint area having a first use frequency and a second area having a second use frequency that is less than the first use frequency. The plurality of patches are present in the touchpoint area in a first concentration and are configured to direct the contaminant towards the second area. The plurality of patches are present in the second area in a second concentration that is higher than the first concentration and are configured to reduce the visibility of the contaminant.

In one aspect, the touchpoint area may have a first initial contaminant concentration and the second area may have a second initial contaminant concentration that is lower than the first initial contaminant concentration. Further, the first touchpoint area may have a first working contaminant concentration and the second area may have a second working contaminant concentration that is higher than the first working contaminant concentration.

The touchpoint area may have a center and the second area may be spaced apart from the center. The plurality of patches may be present in the monolayer in a field having a concentration gradient that may increase with distance from the center so that the plurality of patches are present in the touchpoint area in the first concentration and are present in the second area in the second concentration.

In one aspect, the field may have a circular shape and may radiate from the center. In another aspect, the film may have a perimeter spaced apart from the center and the second area may extend along the perimeter.

In an additional aspect, the concentration gradient may uniformly increase with distance from the center. In a further aspect, the concentration gradient may non-uniformly increase with distance from the center.

The touchpoint area may be substantially free from squalene. Further, the film may have a first surface and a second surface spaced opposite the first surface and abutting the substrate, and the first surface may be substantially free from squalene. In addition, the plurality of patches may be non-uniformly spaced apart from one another along the first surface.

In one aspect, the substrate may have a proximal surface abutting the second surface, a distal surface spaced opposite the proximal surface, a first edge connecting the proximal surface and the distal surface, and a second edge spaced opposite the first edge. The self-cleaning film system may also include a light source disposed adjacent the first edge and configured for emitting electromagnetic radiation.

The electromagnetic radiation may have a wavelength of from 400 nm to 100 nm. In another aspect, the electromagnetic radiation may have a wavelength of from 740 nm to 380 nm. Further, the film may define a contact angle with water of greater than 140°.

The first material may be selected from the group consisting of fluorinated organic compounds, fluorinated inorganic compounds, and combinations thereof.

In one aspect, the photocatalytic material is titanium dioxide and is present in the plurality of patches in a rutile form. In another aspect, the photocatalytic material is titanium dioxide and is present in the plurality of patches in an anatase form. In a further aspect, the photocatalytic material is titanium dioxide and is present in the plurality of patches as a combination of a rutile form and an anatase form. Further, the substrate may be formed from silicon dioxide.

A method of forming a self-cleaning film system configured for reducing a visibility of a contaminant includes depositing a monolayer formed from a first material having a first surface energy onto a substrate. After depositing, the method includes ablating the monolayer to define a plurality of cavities therein. After ablating, the method includes embedding a photocatalytic material having a second surface energy that is higher than the first surface energy into each of the plurality of cavities to form a film on the substrate and thereby form the self-cleaning film system. The film includes a plurality of patches disposed within the plurality of cavities such that the plurality of patches abut the first material. Each of the plurality of patches is formed from the photocatalytic material. The film has a touchpoint area having a first use frequency, and a second area having a second use frequency that is less than the first use frequency. The plurality of patches may be present in the touchpoint area in a first concentration and are configured to direct the contaminant towards the second area. The plurality of patches are present in the second area in a second concentration that is higher than the first concentration and are configured to reducing the visibility of the contaminant.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
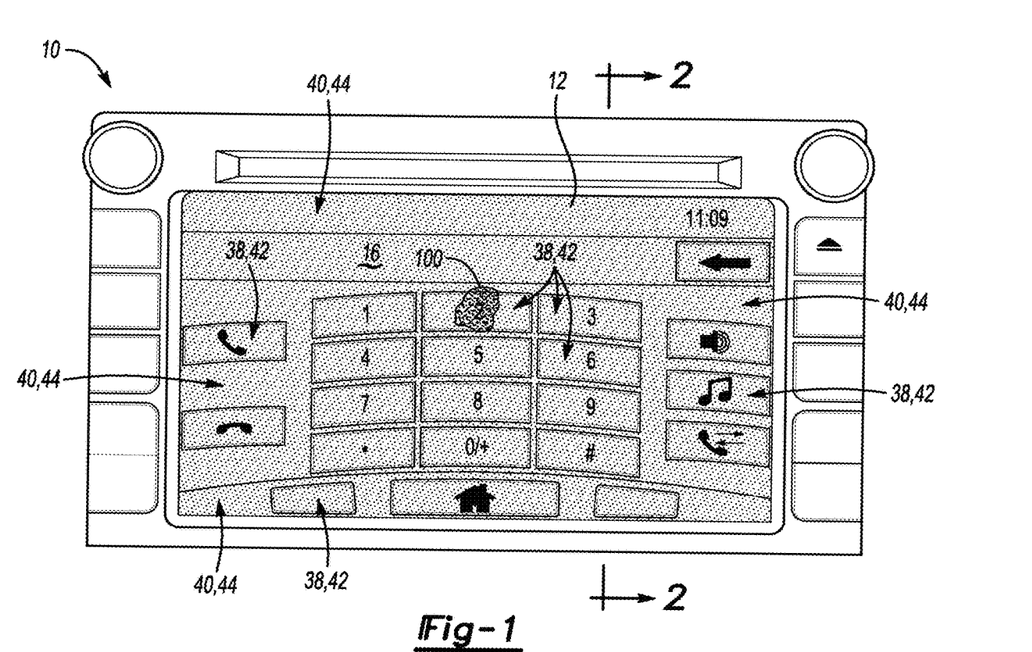
FIG. 1 is a schematic illustration of a front view of a self-cleaning film system including a film disposed on a substrate.

Referring to the Figures, wherein like reference numerals refer to like elements, a self-cleaning film system 10 is shown generally in FIG. 1. The self-cleaning film system 10 is configured for reducing a visibility or conspicuity of a contaminant 100. For example, the self-cleaning film system 10 may be suitable for applications in which an operator may touch and deposit fingerprints, oils, and/or other organic or carbon-based contaminants 100 or pathogens onto a screen, lens, or surface. More specifically, the self-cleaning film system 10 may be useful for applications requiring a clean, substantially fingerprint-free screen, lens, or surface. That is, the self-cleaning film system 10 may be useful for removing fingerprints and other organic contaminants 100 from such screens, lenses, or surfaces.

For example, the self-cleaning film system 10 may be useful for automotive applications such as in-dash navigation systems which include a touchscreen, or vehicle cameras which include a lens. Alternatively, the self-cleaning film system 10 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

Figure 2:
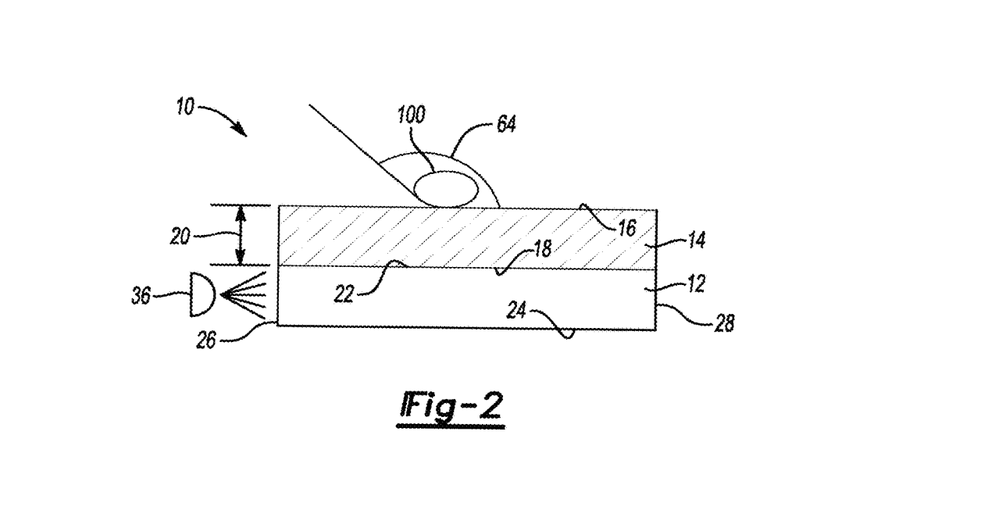
FIG. 2 is a schematic illustration of a cross-sectional view of the self-cleaning film system of FIG. 1 taken along section line 2-2.

Referring now to FIG. 2, the self-cleaning film system 10 includes a substrate 12. The substrate 12 may be formed from a vitreous, transparent material suitable for refracting visible light. For example, in one embodiment, the substrate 12 may be formed from silicon dioxide. In another example, the substrate 12 may be formed from a polycarbonate or other plastic. The substrate 12 may be configured as, by way of non-limiting examples, a screen of a display system, a lens of eyeglasses or goggles, a visor of a helmet, a surface of a refrigerator, a face of a cabinet, a door panel of a vehicle, a touchscreen of a kiosk, or as another surface or device that may be touched by an operator.

The self-cleaning film system 10 also includes a film 14 disposed on the substrate 12, e.g., chemically bonded to the substrate 12 as set forth in more detail below. The film 14 may be configured to cover and protect the substrate 12 from fingerprints, oils, pathogens, and organic contaminants 100 (FIG. 1). That is, the film 14 may be configured to cause fingerprints, oils, pathogens, and organic contaminants 100 deposited on the film 14 to vanish, disappear, or vaporize so as to maintain a clean substrate 12 that is capable of displaying crisp images or reflections.

More specifically, as described with reference to FIG. 2, the film 14 may have a first surface 16 and a second surface 18 spaced opposite the first surface 16. The second surface 18 may abut the substrate 12, and the first surface 16 may be substantially free from squalene, organic material, and/or other oils of fatty acids. As used herein, the terminology squalene refers to an organic compound having 30 carbon atoms and represented by the International Union of Pure and Applied Chemistry name (6E,10E,14E,18E)-2,6,10,15,19,23-hexamethyltetracosa-2,6,10,14,18,22-hexaene. In general, the film 14 may be characterized as a thin film and may have a thickness 20 of, for example, from 10 μm to 150 μm.

The substrate 12 may have a proximal surface 22 abutting the second surface 18 and a distal surface 24 spaced opposite the proximal surface 22. Therefore, the substrate 12 and the film 14 are configured to transmit visible light through the proximal surface 22, the distal surface 24, the first surface 16, and the second surface 18. The substrate 12 may also have a first edge 26 connecting the proximal surface 22 and the distal surface 24, and a second edge 28 spaced opposite the first edge 26. In some embodiments, the substrate 12 may include an anti-reflection film 13. The anti-reflection film 13 may be configured for reducing a reflection off the self-cleaning film system 10 and thereby improving an efficiency of the self-cleaning film system 10 since lost light in the system 10 may be minimized. As such, the self-cleaning film system 10 has both self-cleaning capabilities and comparatively low reflectance. Although not shown, the anti-reflection film 13 may be formed from an anti-reflection coating comprising alternating layers of silicon dioxide and titanium dioxide.

Figure 3:
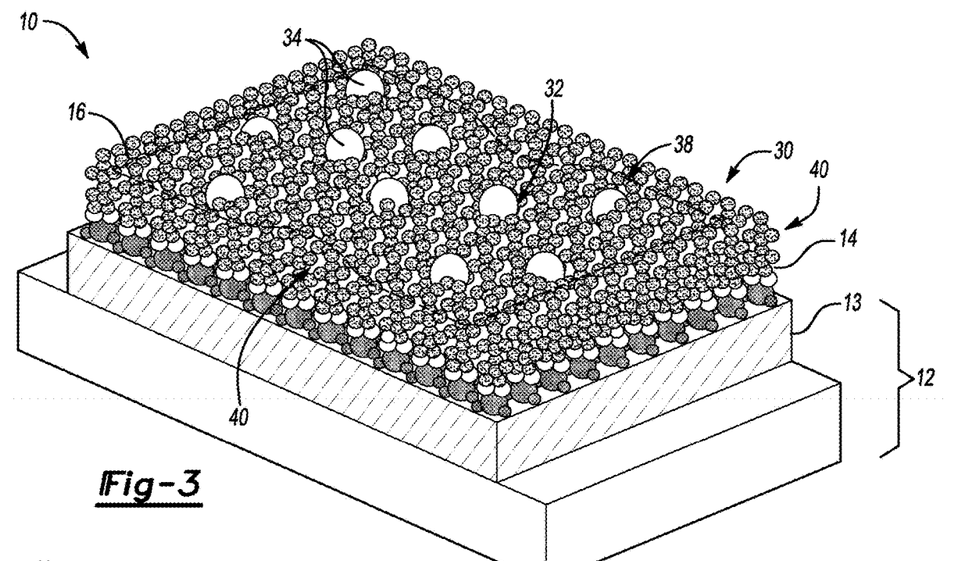
FIG. 3 is a schematic illustration of a magnified, perspective view of the self-cleaning film system of FIG. 1.
Figures 4A, 4B:
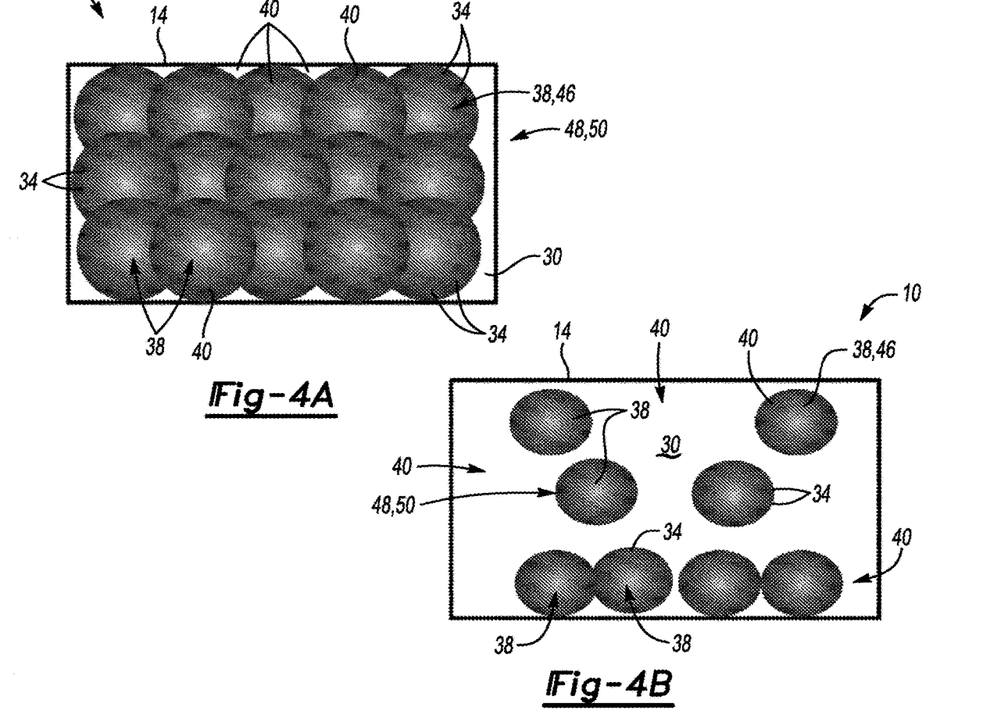
FIG. 4A is a schematic illustration of a top view of a portion of the film of FIG. 1.
FIG. 4B is a schematic illustration of a top view of a portion of a second embodiment of the film of FIG. 1.
Figure 4C:
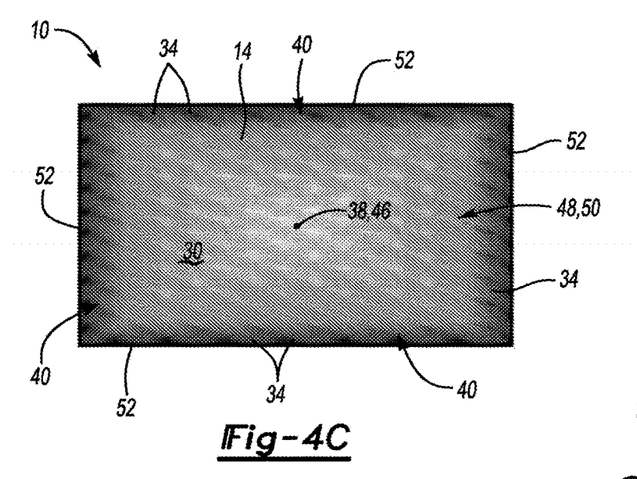
FIG. 4C is a schematic illustration of a top view of a portion of a third embodiment of the film of FIG. 1.

Referring now to FIG. 3, the film 14 includes a monolayer 30 defining a plurality of cavities 32 and formed from a first material having a first surface energy. The first material may be selected from the group consisting of fluorinated organic compounds, fluorinated inorganic compounds, and combinations thereof. For example, the first material may be selected from the group consisting of a perfluorocarbon siloxane polymer, polytetrafluoroethylene, diamond-like carbon, fluorinated diamond-like carbon, and fluorinated tin (IV) oxide. In one example, the first material may be selected from the group consisting of a fluorocarbon polymer, organosiloxane, a fluorinated organosiloxane, and combinations thereof. In one embodiment, the first material may be a fluorinated material. The first material may have a first surface energy at 20° C. of from 15 mN/m to 45 mN/m, e.g., 20 mN/m or 30 mN/m, wherein surface energy refers to the work per unit area done by a force that creates a new surface.

As best shown in FIG. 3, the monolayer 30 may form a majority of the film 14 and may be characterized as a monolayer field. As used herein, the terminology monolayer refers to a layer having a thickness 20 (FIG. 2) of one molecule. That is, the monolayer 30 is one molecule thick and may be characterized as a thin layer.

As shown in FIG. 3, the film 14 also includes a plurality of patches 34 disposed within the plurality of cavities 32 such that the plurality of patches 34 abut the first material. That is, the plurality of patches 34 may be situated within and along the monolayer 30 but may not be covered by the first material. In one embodiment, the plurality of patches 34 may be equally spaced apart from each other along the first surface 16. In other embodiments, the plurality of patches 34 may be randomly spaced throughout the monolayer 30 along the first surface 16. That is, referring to FIG. 3, the plurality of patches 34 may be non-uniformly spaced apart from one another along the first surface 16. In still other embodiments, the plurality of regions 32 may be arranged in a pattern, e.g., a uniform pattern or a non-uniform pattern, within the monolayer 30, as set forth in more detail below. The plurality of patches 34 may be present in the film 14 in an amount of from about 10 parts by volume to about 85 parts by volume based on 100 parts by volume of the film 14.

Each of the plurality of patches 34 is formed from a photocatalytic material having a second surface energy that is higher than the first surface energy. The photocatalytic material may provide the film 14 with self-cleaning capability. That is, the photocatalytic material may oxidize and/or vaporize organic material, e.g., squalene, present on the first surface 16 of the film 14, as set forth in more detail below. In particular, the photocatalytic material may be a light-activated photocatalyst upon exposure to, for example, visible or ultraviolet light.

Suitable photocatalytic materials may include, but are not limited to, photo-oxidative semiconductors, semiconducting oxides, doped metal oxides, heterojunction materials, and combinations thereof. For example, the second material may be titanium dioxide. The second material may have a second surface energy at 20° C. of from 70 mN/m to 200 mN/m, e.g., 90 mN/m or 110 mN/m.

In one embodiment, the photocatalytic material may be titanium dioxide and may be present in the plurality of patches 34 in a rutile form. Alternatively, the photocatalytic material may be titanium dioxide and may be present in the plurality of patches 34 in an anatase form, which may exhibit a comparatively higher photocatalytic activity than the rutile form. In other embodiments, the photocatalytic material may be titanium dioxide and may be present in the plurality of patches 34 as a combination of the rutile form and the anatase form. Further, the photocatalytic material may be doped to form a functionalized photocatalytic material, e.g., functionalized titanium dioxide. For example, the functionalized photocatalytic material may be doped with a metal such as, but not limited to, chromium, cobalt, copper, vanadium, iron, silver, platinum, molybdenum, lanthanum, niobium, and combinations thereof. Alternatively, the functionalized photocatalytic material may be doped with a non-metal such as, but not limited to, nitrogen, sulfur, carbon, boron, potassium, iodine, fluorine, and combinations thereof.

The photocatalytic material may be characterized as a nanoparticle and may have an average diameter measureable on a nanometer scale. Alternatively, the photocatalytic material may be characterized as a particle and may have an average diameter measureable on a micrometer scale. Generally, the photocatalytic material may be present in the film 14 in an amount of from about 2 parts by volume to about 35 parts by volume based on 100 parts by volume of the film 14.

In other non-limiting embodiments, the plurality of patches 34 may include a semiconducting oxide such as, but not limited to, zinc oxide, bismuth, tin oxide, and combinations thereof. The semiconducting oxide may be selected to have a band gap separation suitable for a photocatalytic reaction, as set forth in more detail below.

Referring again to FIG. 2, the film 14 may define a contact angle 64 with water of greater than 140°. For example, the film 14 may define a contact angle 64 with water of greater than or equal to 150°. As such, water, oils, and contaminants 100 may effectively bead on and translate across the first surface 16. Stated differently, water, oils, and contaminants 100 may be mobile and effectively translate along the first surface 16 and the film 14 may not be wettable.

Referring again to FIG. 2, the self-cleaning film system 10 may further include a light source 36 disposed adjacent the first edge 26 and configured for emitting electromagnetic radiation. For example, the light source 36 may be an ultraviolet light-emitting diode and the electromagnetic radiation may have a wavelength of from 400 nm to 100 nm. Alternatively, the light source 36 may be an incandescent bulb or a visible light-emitting diode and the electromagnetic radiation may have a wavelength of from 740 nm to 380 nm.

Referring again to FIG. 1, the film 14 also has a touchpoint area 38 having a first use frequency 42, and a second area 40 having a second use frequency 44 that is less than the first use frequency 42. Stated differently, the touchpoint area 38 may be touched or used more frequently during operation of the self-cleaning film system 10 than the second area 40. For example, the touchpoint area 38 may correspond to areas of the film 14 which actuate common commands or cover preset buttons, such as, but not limited to, a "back" feature, a preset radio frequency, a "home" feature, a "phone" feature, a "mute" feature, an "accept" or "acknowledge" feature, a "personal identification number or PIN" entry box, a "help" feature, numerals on a keypad, a handle, a grip, and the like. The second area 40 may correspond to less-frequently used portions of the film 14, such as, but not limited to, a border, a blank space, a logo, an informational text space, a door panel, a needle, and the like. As such, the first use frequency 42 may be from 10 times to 1,000 times greater than the second use frequency 44. Therefore, an operator may deposit comparatively more contaminants 100, e.g., fingerprints, oil, or organic matter, on the touchpoint area 38 than on the second area 40 during use of the self-cleaning film system 10.

As such, initially, the touchpoint area 38 may have a first initial contaminant concentration and the second area 40 may have a second initial contaminant concentration that is lower than the first initial contaminant concentration. However, during use, the first touchpoint area 38 may have a first working contaminant concentration and the second area 40 may have a second working contaminant concentration that is higher than the first working contaminant concentration. That is, when an operator touches the film 14 at the touchpoint area 38, the contaminant 100 or fingerprint oil may be deposited in a gradient on the film 14. More specifically, the contaminant 100 or fingerprint oil may be physisorbed onto the first surface 16 and may deposit relatively more of the contaminant 100 on the plurality of patches 34 (FIG. 3) than on the monolayer 30 (FIG. 3) due to van der Waals forces. However, as the photocatalytic material of the plurality of patches 34 photocatalytically degrades the contaminant 100, the gradient may reverse so that there is relatively more of the contaminant 100 on the monolayer 30 than on the plurality of patches 34.

Further, since the first surface energy of the monolayer 30 is lower than the second surface energy of the photocatalytic material, the contaminant 100 may be drawn to the photocatalytic material. Therefore, depending on a placement of the plurality of patches 34, the contaminant 100 may be induced to move away from the touchpoint area 38 having the higher, first initial contaminant concentration to the second area 40 having the lower, second initial contaminant concentration. Then, as the contaminant 100 newly arrives at the plurality of patches 34, the photocatalytic material may degrade the contaminant 100. As such, the second area 40 may have the higher second working contaminant concentration as the contaminant 100 is continuously directed to the second area 40.

As such, by arranging the plurality of patches 34 in a pattern, as described with reference to FIGS. 4A-5B, the film 14 may orchestrate the diffusion of the contaminant 100 away from high-use areas, i.e., the touchpoint areas 38, to low-use areas, i.e., the second areas 40, to balance a photocatalytic workload of the photocatalytic material, oxidize and vaporize the contaminant 100, and reduce the visibility of the contaminant 100. In particular, and as set forth in more detail below, the plurality of patches 34 are present in the touchpoint area 38 (FIG. 1) in a first concentration and are configured to direct the contaminant 100 towards the second area 40 (FIG. 1). The plurality of patches 34 are present in the second area 40 in a second concentration that is higher than the first concentration and are configured to reduce the visibility or conspicuousness of the contaminant 100.

For example, as shown in several embodiments in FIGS. 4A-5B, the touchpoint area 38 may have a center 46 and the second area 40 may be spaced apart from the center 46. The plurality of patches 34 formed from the photocatalytic material may be present in the monolayer 30 (FIG. 3) in a field 48 having a concentration gradient 50 that increases with distance from the center 46 so that the plurality of patches 34 are present in the touchpoint area 38 in the first concentration and are present in the second area 40 in the second concentration. Therefore, the film 14 may direct diffusion of the contaminant 100 (FIG. 1) away from the center 46 of the touchpoint area 38 and to the second area 40, which may include a comparatively higher second concentration of the plurality of patches 34 and the photocatalytic material. That is, the film 14 may direct the contaminant 100 towards the second area 40 for photocatalytic degradation of the contaminant 100. Therefore, the touchpoint area 38 may be substantially free from squalene. In other words, the high use areas of the film 14, i.e., the touchpoint areas 38, may be substantially free from fingerprints and contaminants 100.

In one embodiment described with reference to FIGS. 5A and 5B, the field 48 of the plurality of patches 34 present in the monolayer 30 (FIG. 3) may have a circular shape and may radiate from the center 46. In another embodiment described with reference to FIG. 4C, the film 14 may have a perimeter 52 spaced apart from the center 46, and the second area 40 may extend along the perimeter 52. For this embodiment, the second area 40 may act as a sink for the contaminant 100 and may be obscured from a view of the user by, for example, a trim piece, molding, or text. Therefore, during use, the contaminant 100 may migrate outside of the view of the user and may fall or vaporize off the perimeter 52.

Figure 5A:
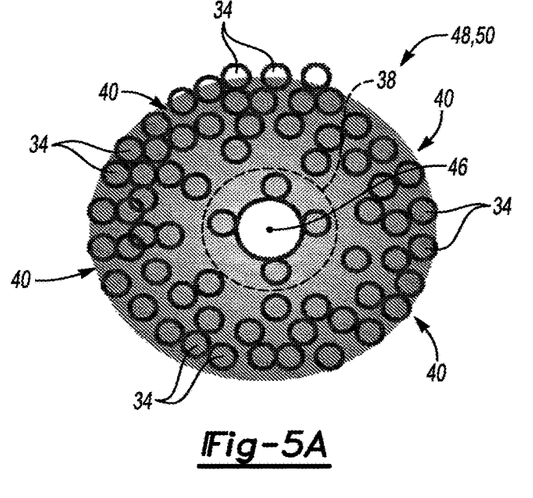
FIG. 5A is a schematic illustration of a top view of a field of the film of FIG. 1.
Figure 5B:
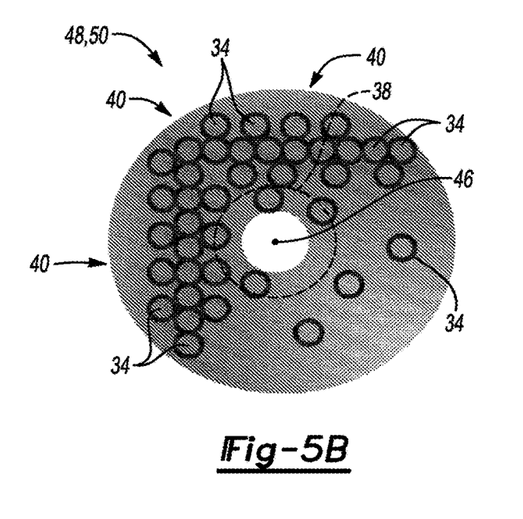
FIG. 5B is a schematic illustration of a top view of another embodiment of the field of FIG. 5A.

Referring to FIG. 5A, the concentration gradient 50 may uniformly increase with distance from the center 46. Alternatively, referring to FIG. 5B, the concentration gradient 50 may non-uniformly increase with distance from the center 46 and may include a directional gradient for guiding the contaminant 100 across the film 14 in a certain direction.

Figure 6:
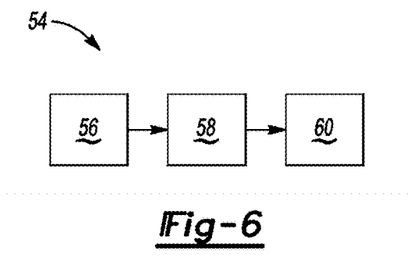
FIG. 6 is a flowchart of one embodiment of a method of forming the self-cleaning film system of FIG. 1.
Figure 7:
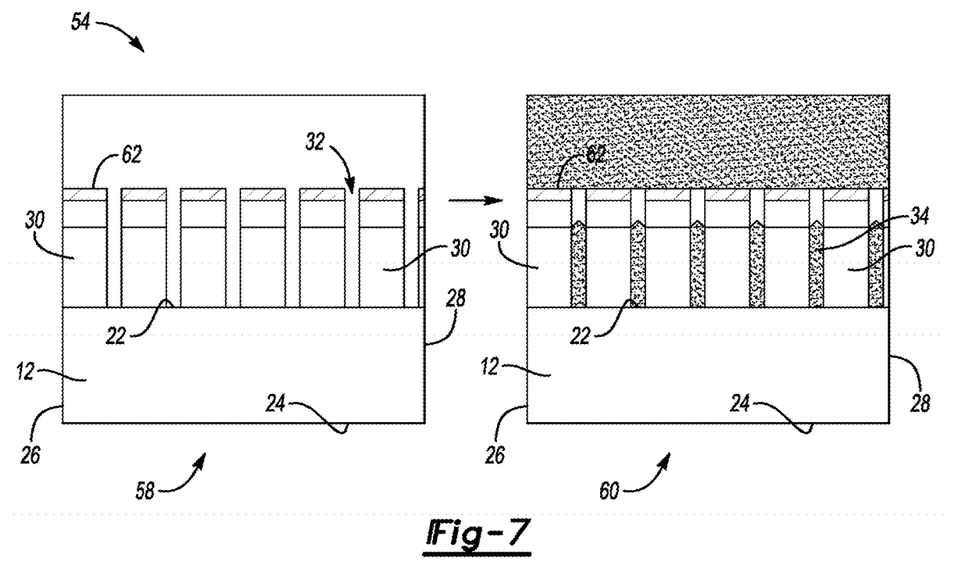
FIG. 7 is a schematic illustration of portions of the method of FIG. 6.

Referring now to FIGS. 6 and 7, a method 54 of forming the self-cleaning film system 10 (FIG. 1) is illustrated generally. The method 54 includes depositing 56 the monolayer 30 formed from the first material having the first surface energy onto the substrate 12. By way of non-limiting examples, depositing 56 may include spraying, rolling, coating, dipping, physical vapor depositing, chemical vapor depositing, molecular layer depositing, atomic layer depositing, and combinations thereof. That is, the monolayer 30 may be deposited in a suitable manner onto the substrate 12 such that the monolayer 30 chemically or physically bonds to the substrate 12. For example, for embodiments in which the first material is a perfluoro-organosiloxane and the substrate 12 is formed from silicon dioxide, each molecule of the first material may be crosslinked to adjacent molecules of the first material and new chemical bonds may be generated at the proximal surface 22 (FIG. 2) as the monolayer 30 is deposited onto the substrate 12.

After depositing 56, the method 54 includes ablating 58 the monolayer 30 to define a plurality of cavities 32 (FIG. 7) therein. As non-limiting examples, ablating 58 may include laser ablating, plasma ablating, ultraviolet ablating, and the like. Ablating 58 may remove several molecules of the monolayer 30 along the proximal surface 22 to define the plurality of cavities 32. Generally, the plurality of cavities 32 may extend from the first surface 16 (FIG. 2) of the film 14 to the second surface 18 (FIG. 2) of the film 14.

After ablating 58, the method 54 includes embedding 60 the photocatalytic material having the second surface energy that is higher than the first surface energy into each of the plurality of cavities 32 to form the film 14 on the substrate 12 and thereby form the self-cleaning film system 10. Therefore, the film 14 includes the plurality of patches 34 including the photocatalytic material and disposed within the monolayer 30 such that each of the plurality of patches 34 abuts the first material. Embedding 60 may include implanting or arranging the photocatalytic material into the monolayer 30 such that the photocatalytic material forms pillars within the plurality of patches 34. For example, embedding 60 may include covering portions of the monolayer 30 with a mask 62 (FIG. 7) such that photocatalytic material is solely embedded into the plurality of cavities 32 and is not deposited on top of the monolayer 30. Suitable processes for embedding 60 the photocatalytic material into the plurality of cavities 32 to form the plurality of patches 34 in the monolayer 30 include, but are not limited to, ion beam deposition, atomic layer deposition, chemical vapor deposition, physical vapor deposition, chemical precipitation, electrophoresis deposition, sputtering, co-sputtering, ion implantation, evaporation, co-evaporation, and pulsed laser deposition.

In another embodiment, although not shown, the method 54 may include concurrently chemisorbing the first material and a functionalized photocatalytic material onto the substrate 12 to form the film 14 chemically bonded to the substrate 12 and thereby form the self-cleaning film system 10. The film 14 thus includes the monolayer 30 formed from the first material, and the plurality of patches 34 each formed from the functionalized photocatalytic material and each disposed within the monolayer 30 such that each of the plurality of patches 34 abuts the first material. That is, the first material and the functionalized photocatalytic material may be deposited onto the substrate 12, simultaneously adsorbed onto the substrate 12, and chemically bonded to the substrate 12. The proximal surface 22 of the substrate 12 may concurrently chemically react with the first material and the functionalized photocatalytic material to form the film 14.

After embedding 60 or concurrently chemisorbing, the film 14 includes the plurality of patches 34 formed from the photocatalytic material and spaced apart from one another along the first surface 16 (FIG. 2). Such patches 34 may be useful for removing fingerprints from the film 14 so that the film 14 exhibits self-cleaning capability.

More specifically, the method 54 may further include irradiating the plurality of patches 34 with electromagnetic radiation having a wavelength of from 400 nm to 100 nm, i.e., irradiating the plurality of patches 34 with ultraviolet light. Alternatively, the method 54 may include irradiating the plurality of patches 34 with electromagnetic radiation having a wavelength of from 740 nm to 380 nm, i.e., irradiating the plurality of patches 34 with visible light. That is, the light source 36 (FIG. 2) may be selected to emit electromagnetic radiation having a wavelength tuned to a bandgap of the photocatalytic material to initiate photocatalysis of the squalene or contaminant 100 deposited as a fingerprint, as set forth in more detail below. As used herein, the terminology bandgap refers to a difference in energy between the highest permitted energy level for an electron in a valence band of the photocatalytic material and the lowest permitted energy level in a conduction band of the photocatalytic material. In other words, the bandgap refers to the minimum amount of light required to make the photocatalytic material electrically conductive.

The method 54 may further include contacting the film 14 and the contaminant 100. That is, contacting may include touching the film 14 such that an operator deposits fingerprints, squalene, organic matter, and/or oils onto the first surface 16 (FIG. 2). Oils may include oils of fatty acids and may be synthesized naturally and applied to the film 14 as the operator touches the film 14, or may be applied to the film 14 artificially such as by spraying or coating. Contact between the squalene or contaminant 100 and the photocatalytic material which is exposed to electromagnetic radiation emitted by the light source 36 may initiate a photocatalytic reaction. More specifically, the photocatalytic material may be a photocatalyst such as titanium dioxide. The photocatalytic reaction may create a strong oxidation agent and breakdown the organic matter, e.g., squalene, to carbon dioxide and water in the presence of the photocatalyst, i.e., the photocatalytic material; electromagnetic radiation, e.g., ultraviolet light; and water, e.g., humidity from ambient conditions. As such, the photocatalytic material not be consumed by the catalytic reaction, but may instead solely accelerate the photocatalytic reaction as a non-reactant.

In greater detail, when electromagnetic radiation having a desired wavelength illuminates the photocatalytic material, an electron from the valence band of the photocatalytic material may promote to the conduction band of the photocatalytic material, which in turn may create a hole in the valence band and an excess of negative charge or electron in the conduction band. The hole may assist oxidation and the electron may assist reduction. Generally, the hole may combine with water to produce a hydroxyl radical (.OH). The hole may also react directly with squalene or other organic material to increase an overall self-cleaning efficiency of the film 14. Similarly, oxygen in the ambient environment surrounding the photocatalytic material may be reduced by the electron to form a superoxide ion ($.O_2-$), which in turn may oxidize the organic material present on the film 14. Therefore, the method 54 may include oxidizing the squalene or contaminant 100.

In addition, the hole may become trapped before recombination with the electron. For such situations, the photocatalytic material may be functionalized. For example, the method 54 may include doping titanium dioxide with, for example, palladium or ruthenium. The palladium or ruthenium may act as an electrocatalyst and may increase a transfer of electrons to oxygen molecules, which may in turn lower the occurrence of the recombination of electrons and holes.

Further, organic material that is present on the film 14 at the monolayer 30 rather than in direct contact with the plurality of patches 34 may be in dynamic equilibrium with the first surface 16 (FIG. 2) and may diffuse toward a comparatively higher-energy location on the film 14, i.e., the plurality of patches 34. Therefore, the method 54 may also include diffusing the squalene along the film 14 from the monolayer 30 to at least one of the plurality of patches 34. To improve such diffusion, the light source 36 may be tuned to emit electromagnetic radiation having a wavelength that is tuned to a vibration resonance of the squalene and the fluorocarbon. Such tuning may enable the squalene or fingerprint to wiggle or translate along the monolayer 30 to the plurality of patches 34 where the squalene or contaminant 100 may undergo the photocatalytic reaction described above. Alternatively or additionally, the film 14 may also be heated, for example by infrared radiation, to further improve diffusion across the monolayer 30 towards the plurality of patches 34.

As such, the method 54 may further include vaporizing the squalene or contaminant 100. More specifically, once the contaminant 100 contacts the photocatalytic material at the plurality of patches 34, the contaminant 100 may be photolyzed into comparatively low vapor pressure-sized pieces or parts, which may vaporize off the film 14 and thereby remove the fingerprint or contaminant 100 from the film 14. That is, the film 14 may protect the substrate 12 by removing, e.g., oxidizing and vaporizing the contaminant 100, i.e., the fingerprints, squalene, oils, pathogens, and/or organic material deposited by the touch of an operator. Consequently, the self-cleaning film system 10 and method 54 may provide excellent aesthetics, cleanliness, and readability for display systems, lenses, sensors, and surfaces.

While the best modes for carrying out the disclosure have been described in detail, those familiar with the art to which this disclosure relates will recognize various alternative designs and embodiments for practicing the disclosure within the scope of the appended claims.

What is claimed is:

1. A self-cleaning film system configured for reducing a visibility of a contaminant, the self-cleaning film system comprising:
    a substrate; and
    a film disposed on the substrate and including:
        a monolayer defining a plurality of cavities and formed from a first material having a first surface energy; and
        a plurality of patches disposed within the plurality of cavities such that the plurality of patches abut the first material, wherein each of the plurality of patches is formed from a doped photocatalytic material and having a second surface energy that is higher than the first surface energy;
    wherein the film has:
        a touchpoint area having a first use frequency; and
        a second area having a second use frequency that is less than the first use frequency;
    wherein the plurality of patches are present in the touchpoint area in a first concentration and are configured to direct the contaminant towards the second area; and
    wherein the plurality of patches are present in the second area in a second concentration that is higher than the first concentration and are configured to reduce the visibility of the contaminant.

2. The self-cleaning film system of claim 1, wherein the doped photocatalytic material comprises a doped metal oxide.

3. The self-cleaning film system of claim 1, wherein the doped photocatalytic material comprises a metal dopant or a non-metal dopant.

4. The self-cleaning film system of claim 1, wherein the doped photocatalytic material comprises a dopant selected from the group consisting of: chromium, cobalt, copper, vanadium, iron, silver, platinum, molybdenum, lanthanum, niobium, ruthenium, palladium, nitrogen, sulfur, carbon, boron, potassium, iodine, fluorine, and combinations thereof.

5. The self-cleaning film system of claim 1, wherein the doped photocatalytic material comprises titanium dioxide and platinum.

6. The self-cleaning film system of claim 1, wherein the doped photocatalytic material comprises titanium dioxide and is present in the plurality of patches in an anatase form.

7. The self-cleaning film system of claim 1, wherein the doped photocatalytic material comprises titanium dioxide and is present in the plurality of patches as a combination of a rutile form and an anatase form.

8. The self-cleaning film system of claim 1, wherein the touchpoint area has a center and the second area is spaced apart from the center; and
further wherein the plurality of patches are present in the monolayer in a field having a concentration gradient that increases with distance from the center so that the plurality of patches are present in the touchpoint area in the first concentration and are present in the second area in the second concentration.

9. The self-cleaning film system of claim 8, wherein the field has a circular shape and radiates from the center.

10. The self-cleaning film system of claim 8, wherein the film has a perimeter spaced apart from the center and further wherein the second area extends along the perimeter.

11. The self-cleaning film system of claim 8, wherein the concentration gradient uniformly increases with distance from the center.

12. The self-cleaning film system of claim 8, wherein the concentration gradient non-uniformly increases with distance from the center.

13. The self-cleaning film system of claim 1, wherein the film has a first surface and a second surface spaced opposite the first surface and abutting the substrate, and further wherein the first surface is substantially free from squalene.

14. The self-cleaning film system of claim 1, wherein the plurality of patches are non-uniformly spaced apart from one another along the first surface.

15. The self-cleaning film system of claim 1, wherein the film defines a contact angle with water of greater than 140°.

16. The self-cleaning film system of claim 1, wherein the first material is selected from the group consisting of fluorinated organic compounds, fluorinated inorganic compounds, and combinations thereof.

17. The self-cleaning film system of claim 1, wherein the substrate has:
a proximal surface abutting the second surface;
a distal surface spaced opposite the proximal surface;
a first edge connecting the proximal surface and the distal surface; and
a second edge spaced opposite the first edge; and
further including a light source disposed adjacent the first edge and configured for emitting electromagnetic radiation.

18. The self-cleaning film system of claim 17, wherein the electromagnetic radiation has a wavelength of from 400 nm to 100 nm or from 740 nm to 380 nm.

19. A self-cleaning film system configured for reducing a visibility of a contaminant, the self-cleaning film system comprising:
a substrate; and
a film disposed on the substrate and including:
a monolayer defining a plurality of cavities and formed from a first material having a first surface energy; and
a plurality of patches disposed within the plurality of cavities such that the plurality of patches abut the first material, wherein each of the plurality of patches is formed from a doped photocatalytic material comprising titanium dioxide and having a second surface energy that is higher than the first surface energy;
wherein the film has:
a touchpoint area having a first use frequency; and
a second area having a second use frequency that is less than the first use frequency;
wherein the plurality of patches are present in the touchpoint area in a first concentration and are configured to direct the contaminant towards the second area; and
wherein the plurality of patches are present in the second area in a second concentration that is higher than the first concentration and are configured to reduce the visibility of the contaminant.

20. The self-cleaning film system of claim 19, wherein the doped photocatalytic material comprises a dopant selected from the group consisting of: chromium, cobalt, copper, vanadium, iron, silver, platinum, molybdenum, lanthanum, niobium, ruthenium, palladium, nitrogen, sulfur, carbon, boron, potassium, iodine, fluorine, and combinations thereof.

* * * * *